July 26, 1927.
E. G. CALKINS
1,636,733
TRACTOR ATTACHMENT
Filed March 6, 1926
2 Sheets-Sheet 2
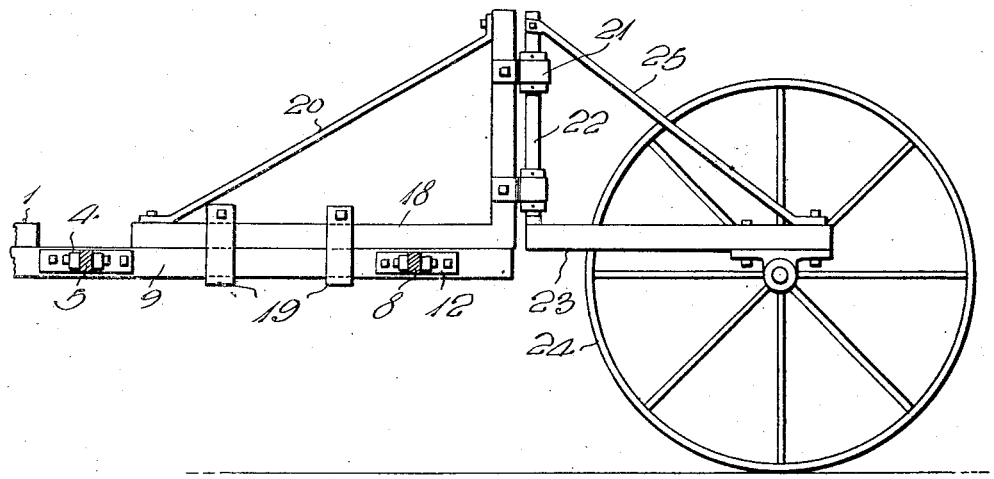
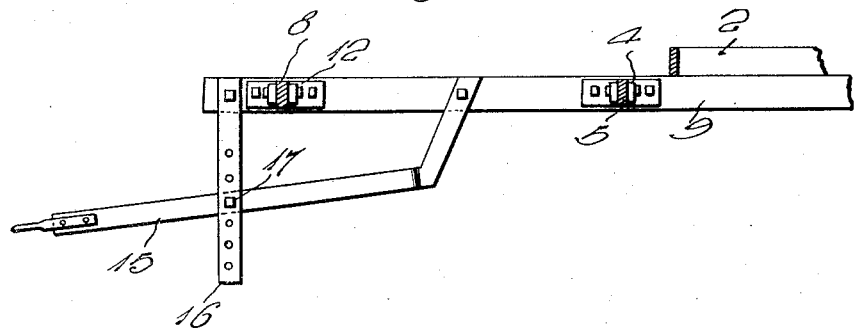
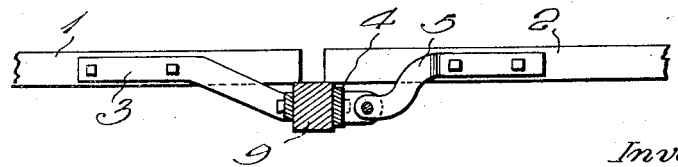
Inventor
E. G. Calkins
By J. H. Lewis
Attorney Patented July 26, 1927.

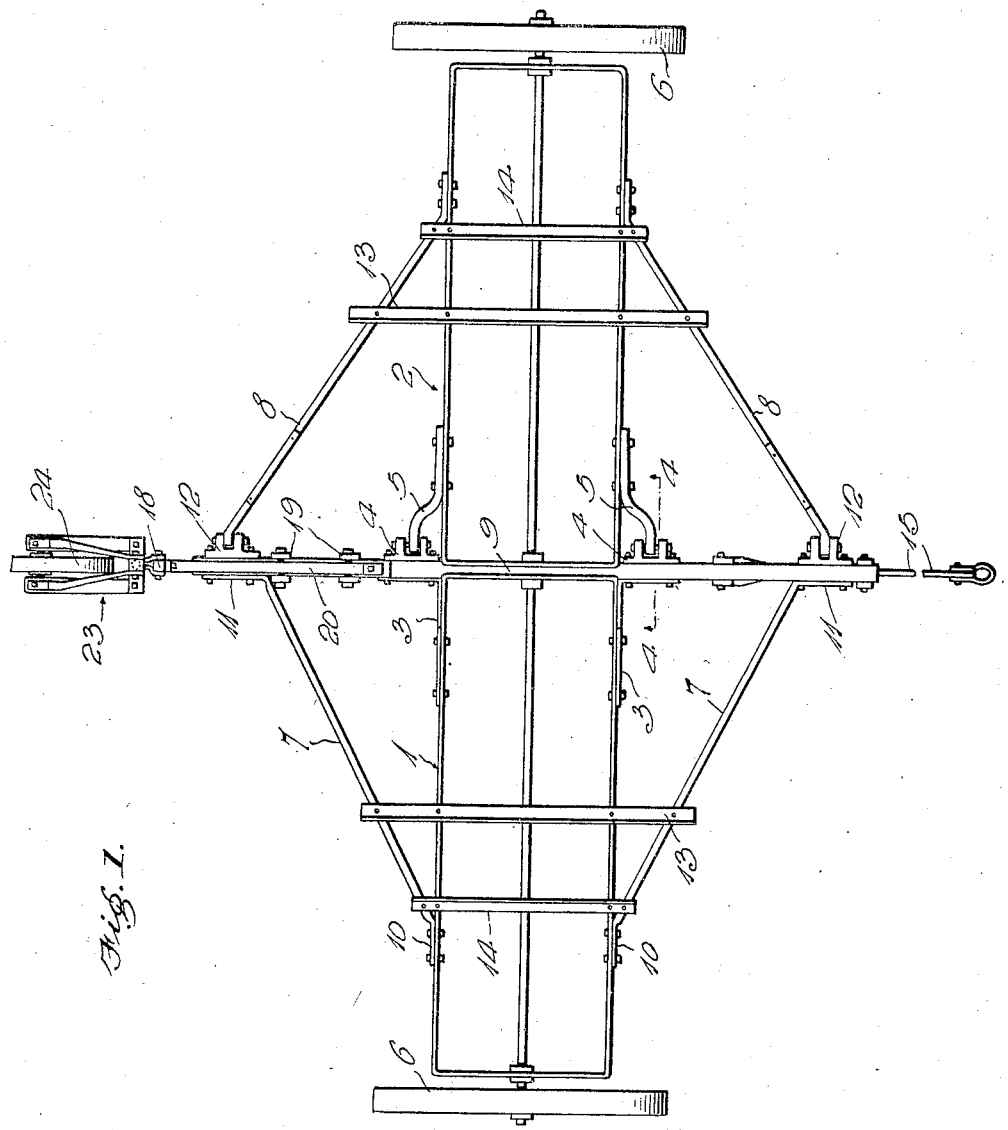

1,636,733

UNITED STATES PATENT OFFICE.

EDGAR GARDNER CALKINS, OF MORLAND, KANSAS.

TRACTOR ATTACHMENT.

Application filed March 6, 1926. Serial No. 92,855.

This invention relates broadly to an improved agricultural machine, and has more specific reference to a wheel supported frame structure especially adapted for supporting a conventional seed drill.

Ordinarily, seed drills are attached to a tractor, and in many instances two or three of such drills are hooked together one behind the other in echelon formation. Under this practice the services of two or more attendants are required to properly attend to the work, and this is not only unduly expensive, but is inconvenient, and undesirable particularly because of the strenuous load and strain to which the tractor is subjected. Numerous other objectional features are apparent to those skilled in the art, but these need not be mentioned in detail.

What I propose is a novel frame structure in the form of an attachment for a tractor, the same comprising means whereby two separate and independent drills are supported in side by side relation and are hingedly connected together so that free relative vertical movement is permitted in order to compensate for the irregularity of the surfaces traversed.

The novel features of construction will become apparent from the following description and drawings:—

Figure 1 is a top plan view of the complete structure with the seed drills removed.

Figure 2 is a detail view of the rear portion of the machine showing the self acting trailer truck.

Figure 3 is a detail view of the adjustable tractor hitch.

Figure 4 is a detail section taken approximately on the plane of the line 4—4 of Figure 1.

Referring to the drawings in detail, the reference characters 1 and 2 designate, in each instance, a rectangular frame made of suitable metal. Each frame is adapted to accommodate a conventional seed drill. While I do not show the drill and make no claim to it, it is understood that it is fastened to the frame in any appropriate manner. The inner end portions of these frames rest on top of a central I-beam, the frame 1 being rigidly secured to the beam by right angle brackets 3. The other frame 2 is hingedly connected to the beam, and this is done by securing two brackets of the type indicated at 4 to the beam and then attaching two arms 5 to the side bars of the frame and pivoting the inner ends between the spaced ears of the brackets. It will be noticed from Figure 4 that the inner ends of the arms are offset downwardly to permit the frame to rest on top of the beam as indicated. From this it will be seen that the frame 1 and beam are rigid and the frame 2 movable with respect thereto. This arrangement, however, allows the two frames to swing down to angular relation to conform somewhat to the contour of the ground. At the outer end of the frames are appropriately mounted wheels 6. An important feature of the construction described is that the ends of the frames 1 and 2 rest upon and are directly supported by the I-beam 9. This relieves the arms 3, 7 and bracket construction 5, 8 of the weight of the frames and heavy seed drills to be mounted thereon. It is only when frame 2 is tilted that elements 5, 8 will be subjected to its weight. This construction greatly increases the durability of the device. It is to be noted that since the arms 3 and brackets 5 are offset and connected to beam 9 at its sides, the top of the frames 1 and 2 will be left clear. Also since the ends of the frames are spaced from each other the frame 2 is free to tilt without engaging frame 1.

For purposes of rigidity, I employ two sets of braces 7 and 8. The braces 7 are fastened securely to the complemental frame 1 and the central beam 9 as indicated at 10 and 11 respectively. On the other hand, brackets 12, similar to those indicated at 4, are fastened to the end portions of the beam, and the braces 8 are pivotally connected thereto and rigidly connected to the frame 2. Then too, cross-braces 13 and 14 are secured to the diagonal braces in both instances.

At the front end of the beam 9 (see Figure 3) is a hitching bar 15 extending through a depending loop 16 and adjustably connected with the latter as at 17. These details, however, may be of any convenient form. Noting now the rear portion of the device, it will be observed that a novel trailer and guiding truck is provided. Referring to Figure 2, it will be evident that this means embodies an L-shaped member 18 clamped, as at 19, to the I-beam. This member is provided with a suitable brace 20, and the upright portion carries bearings 21. A vertical shaft 22 is journaled in these bearings and this shaft is secured at its lower end to a horizontal yoke 23 between the arms of which a wheel 24 is mounted. If desired, another brace 25 may be employed here and connected with the axle and yoke as shown.

It is evident from the foregoing that I have evolved and produced a novel arrangement of parts serving to form a useful and practical support for two separate seed drills. The advantage is compactness and convenience, and permits the single operator of the tractor to do the whole work with little or no trouble.

Moreover, the structure makes for uniform distribution of power and is altogether better than similar devices and machines with which I am familiar.

A careful consideration of the description and drawings will suffice, it is believed, to enable a clear comprehension of the invention to be obtained. For this reason, a more lengthy description in regarded unnecessary.

While the preferred embodiment of the invention has been described and shown, it is understood that minor changes coming within the field of invention as claimed may be resorted to if desired.

Having thus described the invention, what I claim as new and desire to secure by Letters Patent is:—

A device of the class described comprising a central beam, a substantially rectangular frame rigidly fastened to the central portion of the beam on one side, a second duplicate frame hingedly connected to the other side of the beam the ends of said frames resting upon and being supported by said beam, a guide wheel equipped trailer carried by the rear end of the beam, main supporting wheels for the outer ends of said frames, and a tractor hitching device associated with the forward end of the beam.

In testimony whereof I hereunto affix my signature.

EDGAR GARDNER CALKINS.